US012123957B2

(12) United States Patent
Czarnecky et al.

(10) Patent No.: US 12,123,957 B2
(45) Date of Patent: Oct. 22, 2024

(54) GPS TRACKING DEVICE WITH EXTENDED BATTERY LIFE

(71) Applicant: Pinpoint Ideas, LLC, Knoxville, TN (US)

(72) Inventors: Joseph Anthony Czarnecky, Okauchee, WI (US); Steven Andrew Rook, Cary, IL (US); Scott Allen Crutchfield, Oconomowoc, WI (US); Gregory Parker Stair, Knoxville, TN (US)

(73) Assignee: Pinpoint Ideas, LLC, Okouchee, WI (US)

( * ) Notice: Subject to any disclaimer, the term of this patent is extended or adjusted under 35 U.S.C. 154(b) by 352 days.

(21) Appl. No.: 17/166,000

(22) Filed: Feb. 3, 2021

(65) Prior Publication Data

US 2021/0157015 A1 May 27, 2021

Related U.S. Application Data

(62) Division of application No. 16/002,710, filed on Jun. 7, 2018, now abandoned.

(60) Provisional application No. 62/658,144, filed on Apr. 16, 2018.

(51) Int. Cl.
*G01S 19/34* (2010.01)
*G01S 19/26* (2010.01)

(52) U.S. Cl.
CPC .............. *G01S 19/34* (2013.01); *G01S 19/26* (2013.01)

(58) Field of Classification Search
CPC ....... H04W 4/02; H04W 4/021; H04W 4/029; G06Q 10/08; G06Q 10/0833; G01S 19/34; G01S 19/42; G08B 13/00; G08B 21/24
See application file for complete search history.

(56) References Cited

U.S. PATENT DOCUMENTS

| 6,321,091 | B1 * | 11/2001 | Holland | G01S 5/0027 455/414.2 |
| 6,700,533 | B1 | 3/2004 | Werb | |
| 7,171,187 | B2 * | 1/2007 | Haave | B60R 25/102 370/338 |

(Continued)

FOREIGN PATENT DOCUMENTS

| AU | 2014277724 B2 | 7/2016 |
| CA | 2865371 A1 | 3/2015 |

(Continued)

OTHER PUBLICATIONS

Patent Cooperation Treaty, Int'l Search Report, Form PCT/ISA/220; Date of Mailing: Apr. 26, 2022.

*Primary Examiner* — Cassi J Galt
(74) *Attorney, Agent, or Firm* — Pitts Lake, LLC (57) ABSTRACT

A GPS tracking device and system, attached to a boat or other asset, with enhanced battery life includes SaaS application to monitor the status of the GPS tracking device battery and determine the intensity of the tracking information desired as the asset and GPS tracking device is moved from the manufacturer to the consumer. The GPS tracking device is mounted within the boat or other asset on the assembly line or in the field at such location as a dealer, for example, and is carried on the boat from the manufacturer to the dealer and ultimately to the consumer.

9 Claims, 8 Drawing Sheets

(56) References Cited

U.S. PATENT DOCUMENTS

| | | | |
|---|---|---|---|
| 7,455,225 B1* | 11/2008 | Hadfield | G07C 5/085 235/444 |
| 7,755,479 B2 | 7/2010 | Webb, Sr. | |
| 7,924,153 B1 | 4/2011 | Furey | |
| 8,009,086 B2 | 8/2011 | Grossnickle | |
| 8,223,009 B2* | 7/2012 | Anderson | H04W 24/00 705/13 |
| 8,321,124 B2 | 11/2012 | Curatolo | |
| 8,760,274 B2 | 6/2014 | Boling | |
| 8,810,454 B2 | 8/2014 | Cosman | |
| 8,878,670 B2 | 11/2014 | Rosen | |
| 9,066,464 B2 | 6/2015 | Schmidt | |
| 9,094,022 B2 | 7/2015 | Sanderford, Jr. | |
| 9,185,517 B2 | 11/2015 | Kuhl | |
| 9,253,752 B2 | 2/2016 | Lee | |
| 9,456,301 B2 | 9/2016 | Thompson | |
| 9,462,357 B2 | 10/2016 | Westick | |
| 9,547,079 B2 | 1/2017 | Hyatt | |
| 9,549,287 B2 | 1/2017 | Baran | |
| 9,628,951 B1 | 4/2017 | Kolavennu | |
| 9,651,673 B2 | 5/2017 | Lacatus | |
| 9,654,924 B2 | 5/2017 | Jernigan | |
| 9,679,456 B2 | 6/2017 | East | |
| 9,686,743 B2 | 6/2017 | Lacatus | |
| 9,696,429 B2 | 7/2017 | Turon | |
| 9,746,333 B2 | 8/2017 | Barnard | |
| 10,416,280 B2* | 9/2019 | Meadow | G01S 5/14 |
| 10,495,764 B2* | 12/2019 | Bastian, II | B65D 19/0055 |
| 2002/0111884 A1* | 8/2002 | Groat | H04L 9/40 705/28 |
| 2002/0158778 A1 | 10/2002 | Flick | |
| 2005/0200520 A1 | 9/2005 | Jesson | |
| 2006/0022867 A1 | 2/2006 | Hessing | |
| 2006/0202817 A1 | 9/2006 | Mackenzie | |
| 2007/0176771 A1 | 8/2007 | Doyle | |
| 2007/0188333 A1* | 8/2007 | Clancy | G08B 13/246 340/572.9 |
| 2007/0247359 A1 | 10/2007 | Ghazarian | |
| 2008/0007398 A1 | 1/2008 | DeRose | |
| 2008/0191937 A1 | 8/2008 | Wisherd | |
| 2008/0224854 A1 | 9/2008 | Furey | |
| 2008/0246656 A1 | 10/2008 | Ghazarian | |
| 2009/0079565 A1 | 3/2009 | Mackenzie | |
| 2010/0141445 A1 | 6/2010 | Venkatasubramaniyam | |
| 2010/0185524 A1 | 7/2010 | Watkins et al. | |
| 2010/0235121 A1 | 9/2010 | Constien | |
| 2010/0311385 A1 | 9/2010 | Hurwitz | |
| 2010/0253508 A1 | 10/2010 | Koen | |
| 2010/0272262 A1 | 10/2010 | Boubion | |
| 2010/0315235 A1 | 12/2010 | Adegoke | |
| 2011/0047183 A1 | 2/2011 | Ford | |
| 2011/0148626 A1 | 6/2011 | Acevedo | |
| 2011/0020523 A1 | 8/2011 | Furey | |
| 2011/0285535 A1 | 11/2011 | Barwin | |
| 2012/0143397 A1 | 6/2012 | Mackay | |
| 2012/0235860 A1 | 9/2012 | Ghazarian | |
| 2012/0310854 A1 | 12/2012 | Cova | |
| 2013/0072223 A1 | 3/2013 | Berenberg | |
| 2013/0104035 A1 | 4/2013 | Wagner | |
| 2013/0127617 A1 | 5/2013 | Baade | |
| 2013/0321211 A1 | 12/2013 | Chakraborty | |
| 2013/0324151 A1 | 12/2013 | Lee | |
| 2013/0342394 A1 | 12/2013 | Leslie | |
| 2014/0074667 A1 | 3/2014 | Smith | |
| 2014/0095091 A1 | 4/2014 | Moore | |
| 2014/0164191 A1 | 6/2014 | Gafford | |
| 2014/0187261 A1 | 7/2014 | Lee | |
| 2014/0253333 A1* | 9/2014 | Patterson | G08B 13/2482 340/572.4 |
| 2014/0279297 A1* | 9/2014 | Morgan | G06Q 40/02 705/28 |
| 2014/0374478 A1 | 12/2014 | Dearing | |
| 2015/0057015 A1 | 2/2015 | Bertagna | |
| 2015/0077247 A1 | 3/2015 | Curatolo | |
| 2015/0095336 A1 | 4/2015 | Green | |
| 2015/0204974 A1 | 7/2015 | Pillay | |
| 2015/0223019 A1 | 8/2015 | East | |
| 2015/0271638 A1 | 9/2015 | Menayas | |
| 2015/0282364 A1 | 10/2015 | Moon et al. | |
| 2015/0296332 A1 | 10/2015 | Lee | |
| 2015/0364017 A1 | 12/2015 | Hall | |
| 2015/0369618 A1 | 12/2015 | Kuhl | |
| 2016/0049014 A1 | 2/2016 | Wells | |
| 2016/0054448 A1* | 2/2016 | Woolf | G01S 19/14 342/357.52 |
| 2016/0066138 A1 | 3/2016 | Kuhl | |
| 2016/0105868 A1 | 4/2016 | Lee | |
| 2016/0116596 A1 | 4/2016 | Rajala | |
| 2016/0142099 A1 | 5/2016 | D'Amico | |
| 2016/0142881 A1 | 5/2016 | D'Amico | |
| 2016/0171433 A1 | 6/2016 | Dearing | |
| 2016/0180135 A1 | 6/2016 | Dearing | |
| 2016/0198294 A1 | 7/2016 | Bertagna | |
| 2016/0212586 A1 | 7/2016 | Ziskind | |
| 2016/0240018 A1 | 8/2016 | Shayovitch | |
| 2016/0286349 A1 | 9/2016 | Borghei | |
| 2017/0006419 A1 | 1/2017 | Rajala | |
| 2017/0023377 A1 | 1/2017 | Burtner | |
| 2017/0027981 A1 | 2/2017 | Casuscelli | |
| 2017/0039632 A1 | 2/2017 | Meagher | |
| 2017/0053234 A1 | 2/2017 | Lozito | |
| 2017/0082728 A1 | 3/2017 | Hyatt | |
| 2017/0148241 A1 | 5/2017 | Kerning | |
| 2017/0181100 A1 | 6/2017 | Kolavennu | |
| 2017/0195848 A1 | 7/2017 | Komeluk | |
| 2017/0195958 A1 | 7/2017 | Komeluk | |
| 2017/0230790 A1 | 8/2017 | Skomra | |
| 2017/0234931 A1 | 8/2017 | Moore | |
| 2018/0084388 A1 | 3/2018 | Askar | |
| 2019/0311596 A1 | 10/2019 | Valentino et al. | |
| 2019/0317223 A1 | 10/2019 | Czarnecky et al. | |
| 2020/0128482 A1 | 4/2020 | Daoura et al. | |

FOREIGN PATENT DOCUMENTS

| | | |
|---|---|---|
| CA | 2847766 A1 | 7/2015 |
| CN | 201765318 U | 3/2011 |
| DE | 102009041128 B4 | 7/2016 |
| GB | 2417118 A | 2/2006 |
| IN | 4843CHENP2015 A | 7/2016 |
| MX | 342096 B | 9/2016 |
| WO | WO0148505 A3 | 1/2002 |
| WO | WO2007109838 A1 | 10/2007 |
| WO | WO2011013084 A1 | 2/2011 |
| WO | WO2011116400 A1 | 9/2011 |
| WO | WO2011146770 A1 | 11/2011 |
| WO | WO2013078291 A1 | 5/2013 |
| WO | WO2014008752 A1 | 1/2014 |
| WO | WO2014197497 A9 | 1/2015 |
| WO | WO2015149107 A1 | 10/2015 |
| WO | WO2016164931 A1 | 10/2016 |

* cited by examiner

GPS TRACKING DEVICE WITH EXTENDED BATTERY LIFE

CROSS-REFERENCE TO RELATED APPLICATIONS

This application is a divisional of U.S. application Ser. No. 16/002,710, filed on Jun. 7, 2018, which claims the benefit of U.S. Provisional Application No. 62/658,144, filed on Apr. 16, 2018. The aforementioned applications are incorporated herein by reference, in their entirety, for any purpose.

BACKGROUND

Global Positioning System (GPS) devices with cellular modems have been used for many years to provide accurate geolocation and time information to users anywhere on or near the earth. Although originally created for military use, these devices can be used for a number of different purposes including fleet tracking, geofencing, data mining, robotics and athletics. Manufacturers and dealers can use them to maintain data regarding their inventory and to provide valuable marketing data such as time and location of sales and delivery.

When used by manufacturers or dealers to track boats, power sports, recreational vehicles or other assets, there are certain asset states where it is not as critical for the GPS tracking device to constantly send position transmissions. For example, where the asset is located within a physical or Geofence location on the manufacturer's site or is located at a dealer location prior to sale, then limited transmissions would be acceptable since it is assumed that there would be little to no movement of the asset within these locations. A GPS tracking device attached to an asset, which includes a system for enhancing the battery life located on the GPS tracking device would be beneficial, allowing the GPS tracking device to run for a longer period, limiting the need for battery replacements. The frequency of data transmissions or pings will be dependent on the location of the GPS tracking device and whether it is in motion.

Additionally, this GPS tracking device can provide an option to be operated off of the boat, or other asset, battery rather than the device's internal battery, shifting the power source to the boat. Such a GPS tracking device can be tied to specific manufacture data such as date, model, color, accessories, and engine details, and data can be gathered regarding time and location of sales and boat delivery. This data can be mined and augmented to assist in providing inventory control and other important marketing information to manufacturers.

SUMMARY OF THE INVENTION

Embodiments of the present general inventive concept provide a boat, power sport, recreational vehicle or other asset system for GPS tracking with extended battery life comprising a GPS tracking device with internal battery supply attached to the boat, power sport, recreational vehicle or other asset; software as a service (SaaS) application that determines a frequency of data transmissions required as the boat or other power sport asset moves from a manufacturer to a consumer and collects the data that the GPS tracking device sends through wireless, cellular, WIFI or Blue Tooth technology; Firmware Management software within a chip on the GPS tracking device that determines how often data is sent from the GPS tracking device to the SaaS application; and an accelerometer attached to the GPS tracking device that determines whether the GPS tracking device is moving or stationary.

Example embodiments of the present general inventive concept can be achieved by providing A boat, power sport, recreational vehicle or other asset method for GPS tracking with extended battery life comprising: manufacturing a boat, power sport, recreational vehicle or other asset; attaching a GPS tracking device with internal battery supply to the boat or other power sport asset during manufacturing; providing an option to run the GPS tracking device off of the boat or other power sport asset battery; providing an SaaS application that determines a frequency of data transmissions required of the GPS tracking device as the boat or other power sport asset moves from the manufacturer to the consumer; detecting the presence of Geo Fence boundary by comparing location data against map data; modifying a number and frequency of data transmissions provided by the GPS tracking device based on the presence of a Geo Fence, movement of the GPS tracking device and location of the GPS tracking device; providing the SaaS application with manufacture data related to the boat, power sport, recreational vehicle or other asset; gathering data related to time and location of sales and delivery; and providing the gathered data to manufacturers, dealers, floor plan companies, insurance companies, or others on a subscription basis.

BRIEF DESCRIPTION OF THE DRAWINGS

Example embodiments of the present general inventive concept will become more clearly understood from the following detailed description of the present general inventive concept read together with the drawings in which.

DETAILED DESCRIPTION

Reference will now be made to the example embodiments of the present general inventive concept, examples of which are illustrated in the accompanying drawing(s) and illustration(s). The example embodiments are described herein in order to explain the present general inventive concept by referring to the figure(s). The following detailed description is provided to assist the reader in gaining a comprehensive understanding of the structures described herein. Accordingly, various changes, modification, and equivalents of the structures and techniques described herein will be suggested to those of ordinary skill in the art. The descriptions are merely examples, however, and the sequence type of operations is not limited to that set forth herein and may be changed as is known in the art, with the exception of operations necessarily occurring in a certain order. Also, description of well-known functions and constructions may be omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to various examples of the present general inventive concept, a GPS tracking device and system, attached to a boat or other asset, with enhanced battery life includes an SaaS application controller to monitor the status of the GPS tracking device battery and determine the intensity of the tracking information desired as the asset and GPS tracking device is moved from the manufacturer to the consumer. The GPS tracking device is mounted within the boat or other asset on the assembly line or in the field at such location as a dealer, for example, and is carried on the boat from the manufacturer to the dealer and ultimately to the consumer. Firmware Management software is located within the chip on the GPS tracking device which controls how often the data is sent from the GPS tracking device to the SaaS application. Additionally, the SaaS application can alter how often the GPS tracking device sends position data transmissions. The time interval between position data transmissions from the GPS tracking device will vary dependent on the location, movement, presence of a geofence, and other factors, in order to conserve battery power. The GPS tracking device includes an accelerometer to determine whether it is moving or stationary.

Movement of the GPS tracking device within the asset, coupled with an SaaS application that communicates with the GPS tracking device, can further provide marketing information. For example, the GPS tracking device may be associated with the manufacture date, model, accessories, color, engine or other data concerning the boat or other asset and can gather data regarding time and location of sales and boat or other asset delivery. This data can then be mined and augmented to assist in providing inventory control which may include information as to how long a boat or other asset stays on the dealer's lot, when it is sold, and such information can be used as feedback to the manufacturer to assist in determining the type, color, length and other characteristics of boats or other assets which are moving quickly and are more desirable. This type of marketing data collected by the GPS tracking device can be sold to a manufacturer, dealer, floor plan companies, insurance companies, and others, on a subscription basis.

Similarly, the GPS tracking device can be used to track information of the GPS tracking device within the asset once the asset is transferred to the consumer. The information might include how the asset is being used by the consumer, by whom, time periods and locations, and can be used to track maintenance requirements, for example. This type of information can be valuable for the manufacturer, dealer, insurance company, among others.

Figure 1:
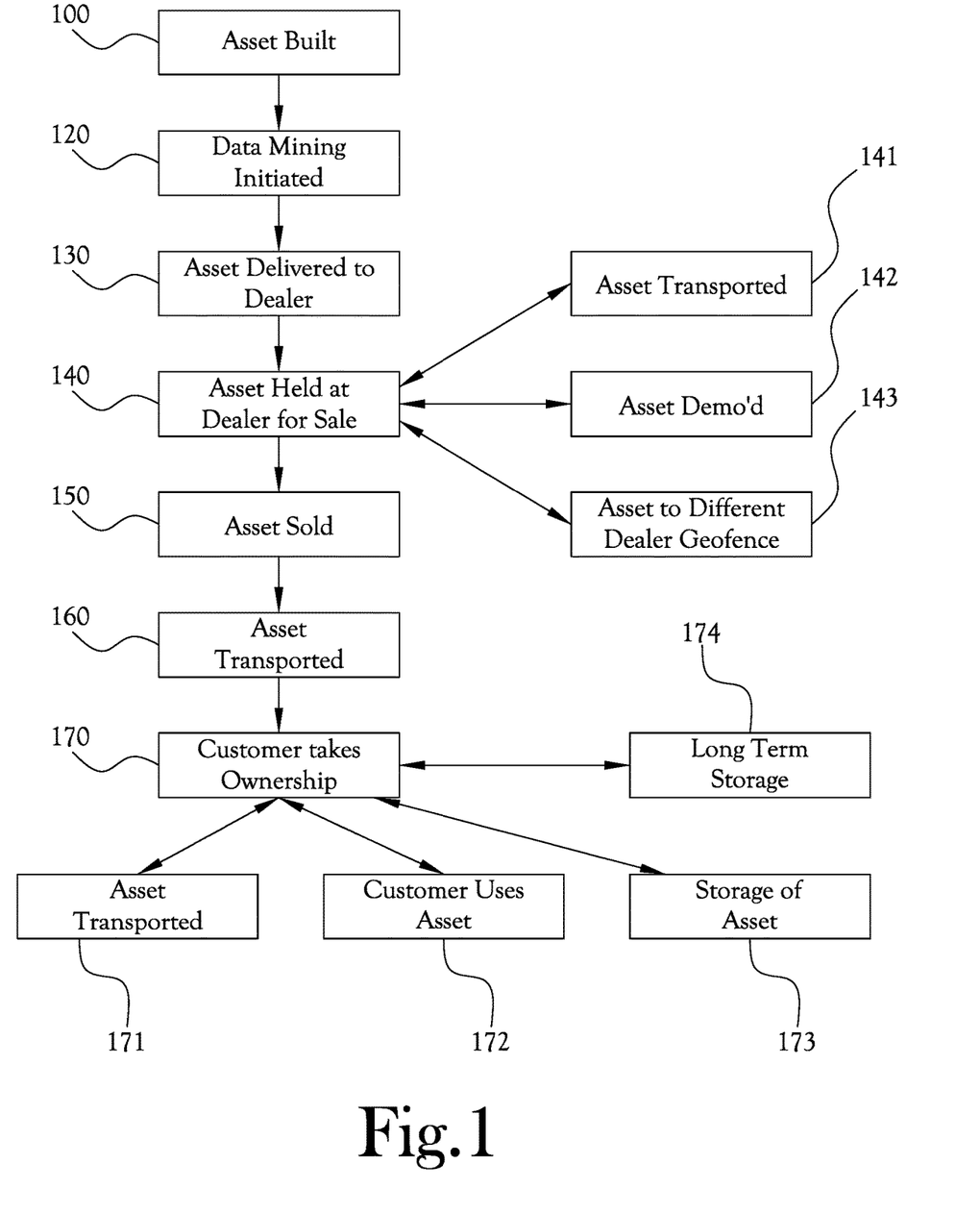
FIG. 1 is a flow diagram showing a top level view of the GPS tracking device and system.

FIG. 1 represents a top level view of the various phases during usage of the GPS tracking device and system. In the first step of the use of the GPS tracking device, the asset is built by the manufacturer 100, with the GPS tracking device installed on the asset. In the next step after the build, data mining is initiated 120. Data mining then continues indefinitely once the GPS tracking device is installed and made available to the different companies along the way, as well as during ownership by the consumer. Next, the asset is delivered to the dealer 130. The asset is then held at the site of the dealer 140 for sale to the public. During this step, the asset may be transported 141 or made available to a potential purchaser by demo 142. Additionally, the asset may be held within a Geofence at the dealer's site or transferred to an alternative Geofence location 143 by the dealer. In the next step, the asset is sold to a consumer 150. The asset is then transported to the consumer 160 and the consumer then takes ownership of the asset 170. As pointed out above, data mining activities continue to take place, and the results of this data can be provided to other dealers and manufacturers. During the ownership of the asset phase, the asset may be transported 171 or the consumer may use the asset 172. Additionally, the asset may be stored 173, for example, at the consumer's place of residence, or the asset may be held within a long term storage facility 174.

Figure 2:
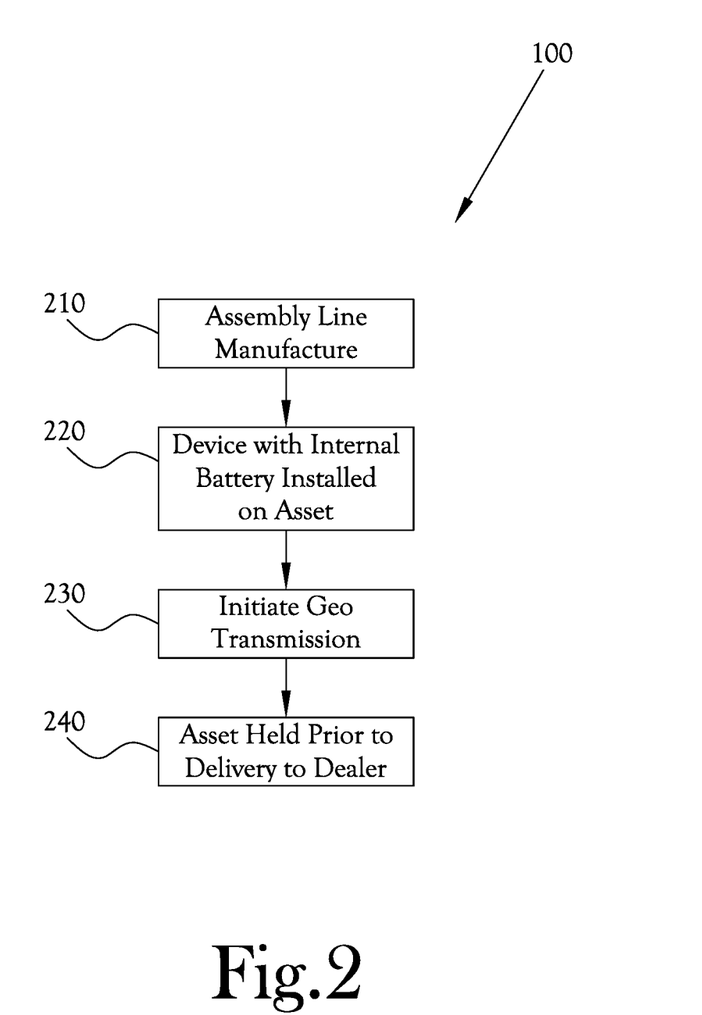
FIG. 2 is a flow diagram showing the asset built step.

FIG. 2 represents the asset built step of FIG. 1. The steps associated with the asset built step include assembly line manufacture of the asset 210, GPS tracking device with internal battery being installed on the asset 220, initiation of the Geo Transmission mode 230, and the asset being held prior to delivery to the Dealer 240. FIG. 2 represents one embodiment of the present invention, as the GPS tracking device can be installed at any point during the process. Once the GPS tracking device is installed on the device, then data mining can commence. FIG. 1 shows the data mining commencing immediately after the asset built phase, in order to capture the data during this phase.

Figure 3:
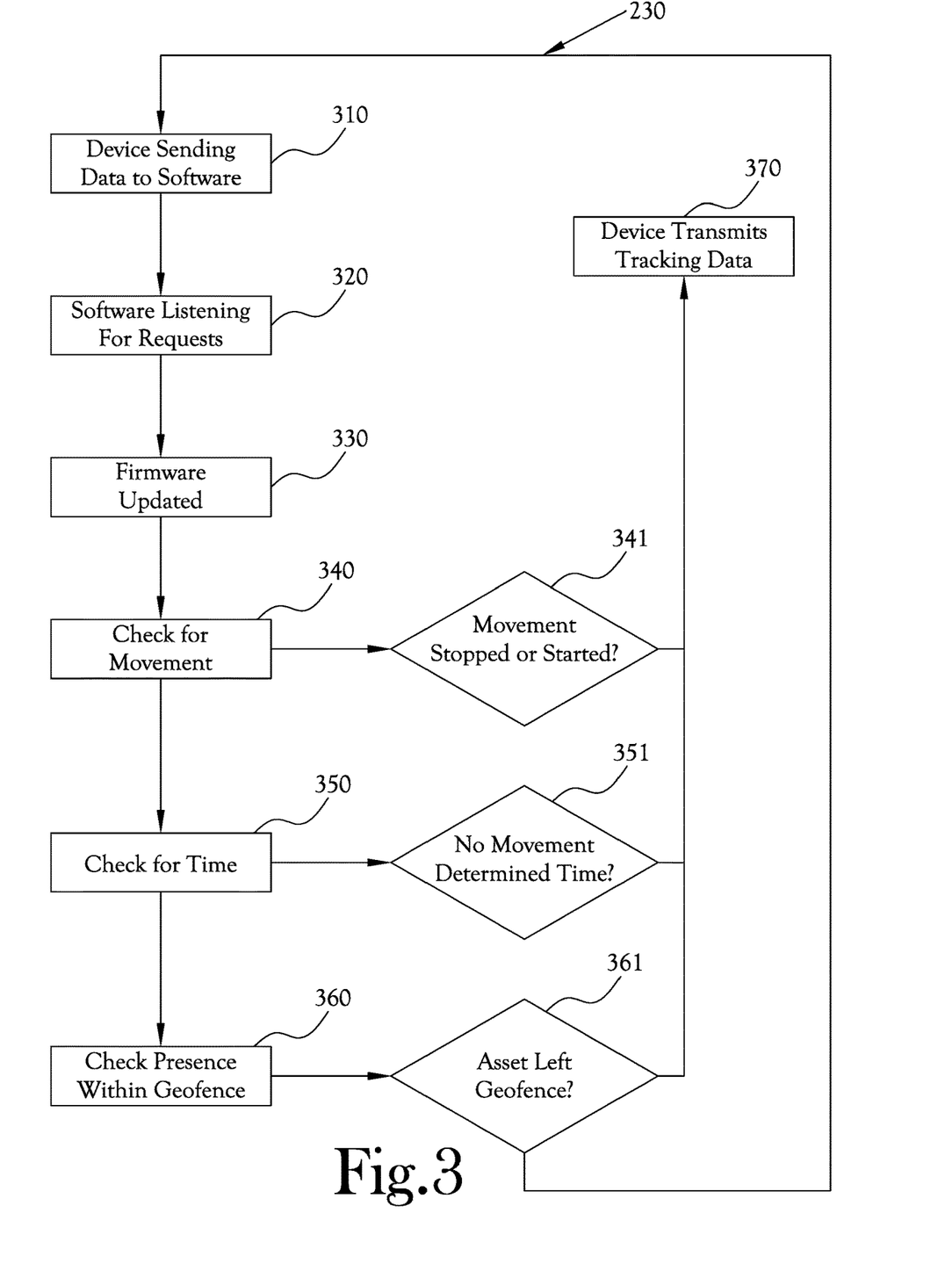
FIG. 3 is a flow diagram showing stages of the process while the GPS tracking device is in the Geo Transmission mode.

FIG. 3 represents the stages of the process while the GPS tracking device is in the Geo Transmission mode shown in FIG. 2. Since the GPS tracking device will be located within a Geofence during this step, full transmission mode will not be required. In the first step shown, the GPS tracking device is constantly sending data to the SaaS application 310 at a rate controlled by instructions from the Firmware Management software within the chip on the GPS tracking device. While the GPS tracking device is sending data, the SaaS application listens for requests for position data transmissions from the GPS tracking device 320. Additionally, the Firmware Management software in the GPS tracking device can be updated 330 by the SaaS application so that the Firmware Management software is set to send the data in different intervals based on the location, activity and sensors on the GPS tracking device. Next, the GPS tracking device checks for movement 340 using an accelerometer. If the GPS tracking device detects that movement has stopped or started 341, the GPS tracking device transmits tracking information 370. Next, the GPS tracking device checks the time durations 350 using its internal clock. If there has been no movement within a specified time frame 351, then the GPS tracking device transmits tracking information 370. Finally, the GPS tracking device checks the presence of the GPS tracking device within a Geofence 360. If the GPS tracking device has left the Geofence 361, then the GPS tracking device transmits tracking information 370 and the mode changes to one of the other modes described below. If the GPS tracking device determines that it is still within the Geofence then the process repeats itself within a loop.

Figure 4:
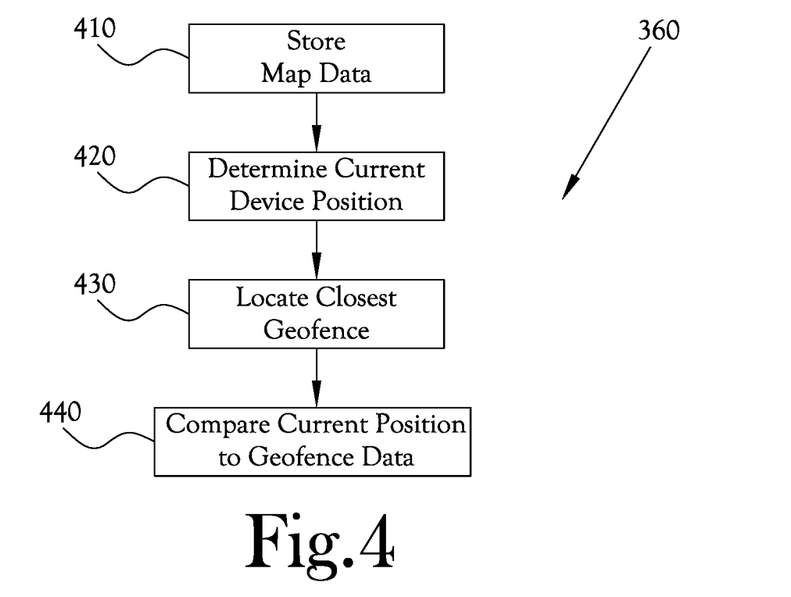
FIG. 4 is a flow diagram showing check presence with a Geofence step.

FIG. 4 represents the check presence with a Geofence step of FIG. 3. In the first step, the GPS tracking device stores map data 410. Then the GPS tracking device determines its current position 420. In the next step, the GPS tracking device locates the closest Geofence 430. Finally, the GPS tracking device compares its current position to the Geofence data 440.

Figure 5:
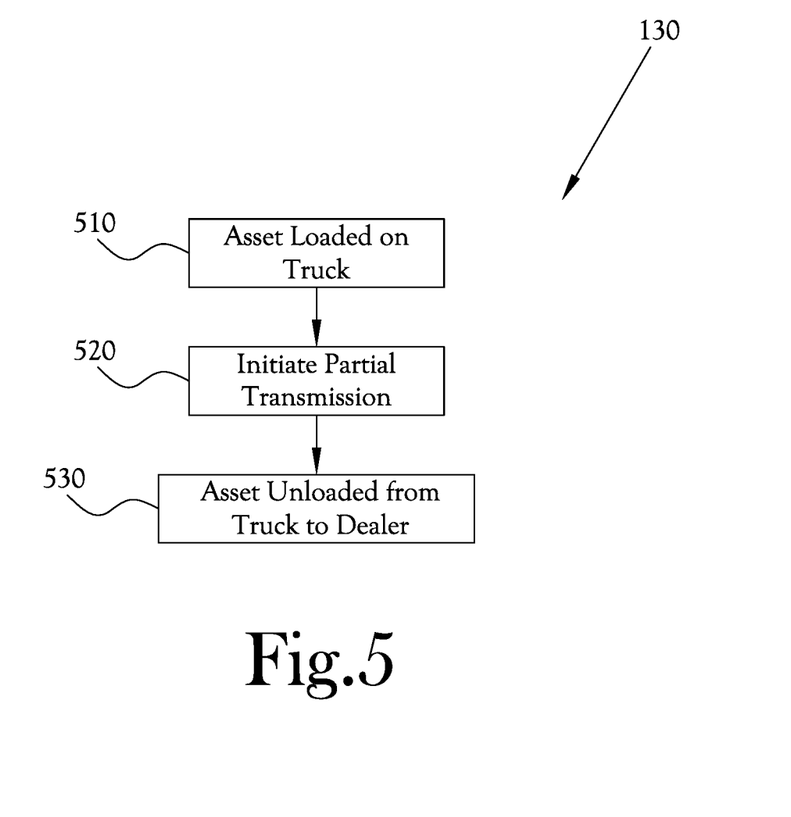
FIG. 5 is a flow diagram showing the asset delivered to dealer step.

FIG. 5 represents the asset delivered to dealer step of FIG. 1. The asset is first loaded on a truck 510 or other transportation device. Then the GPS tracking device initiates partial transmission mode 520. Finally, the asset is unloaded from the truck or other transportation device, and possession of the asset is assumed by the dealer 530.

Figure 6:
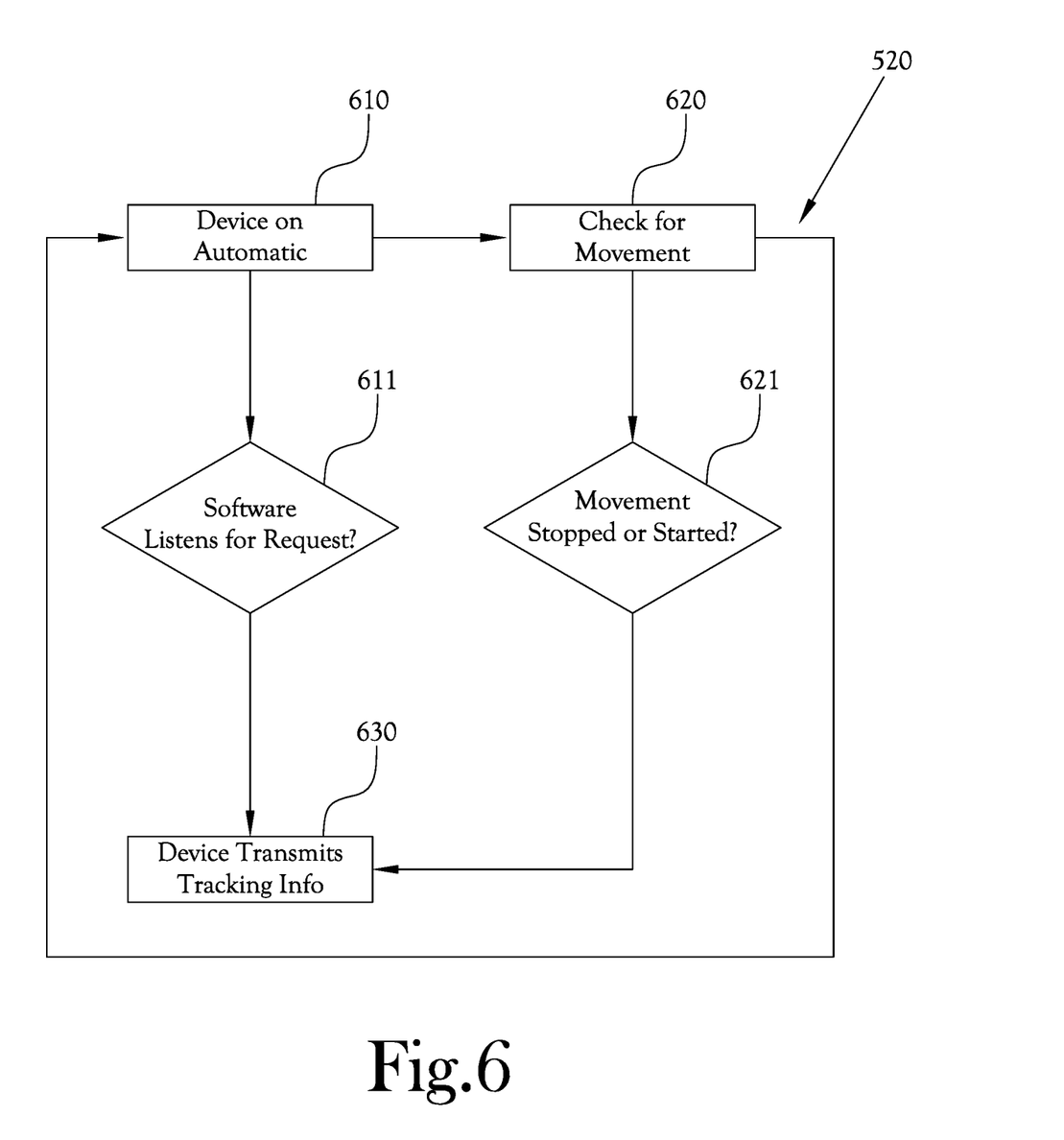
FIG. 6 is a flow diagram showing stages of the process while the GPS tracking device is in the partial transmission mode.

FIG. 6 represents the stages of the process while the GPS tracking device is in the partial transmission mode shown in FIG. 5. During the asset delivered to dealer step of FIG. 5, the need for position data transmissions is at its most minimal point since the asset is in transit within the controlled confines of a carrier. In the first step, as previously shown in FIG. 3, the GPS tracking device is automatically sending data 610, while the SaaS application listens for requests for position data transmissions from the GPS tracking device 621. Next, the GPS tracking device checks for movement 620 using an accelerometer. If the GPS tracking device detects that movement has stopped or started 621, the GPS tracking device transmits tracking information 630. The process then repeats until the asset has reached its destination.

Figure 7:
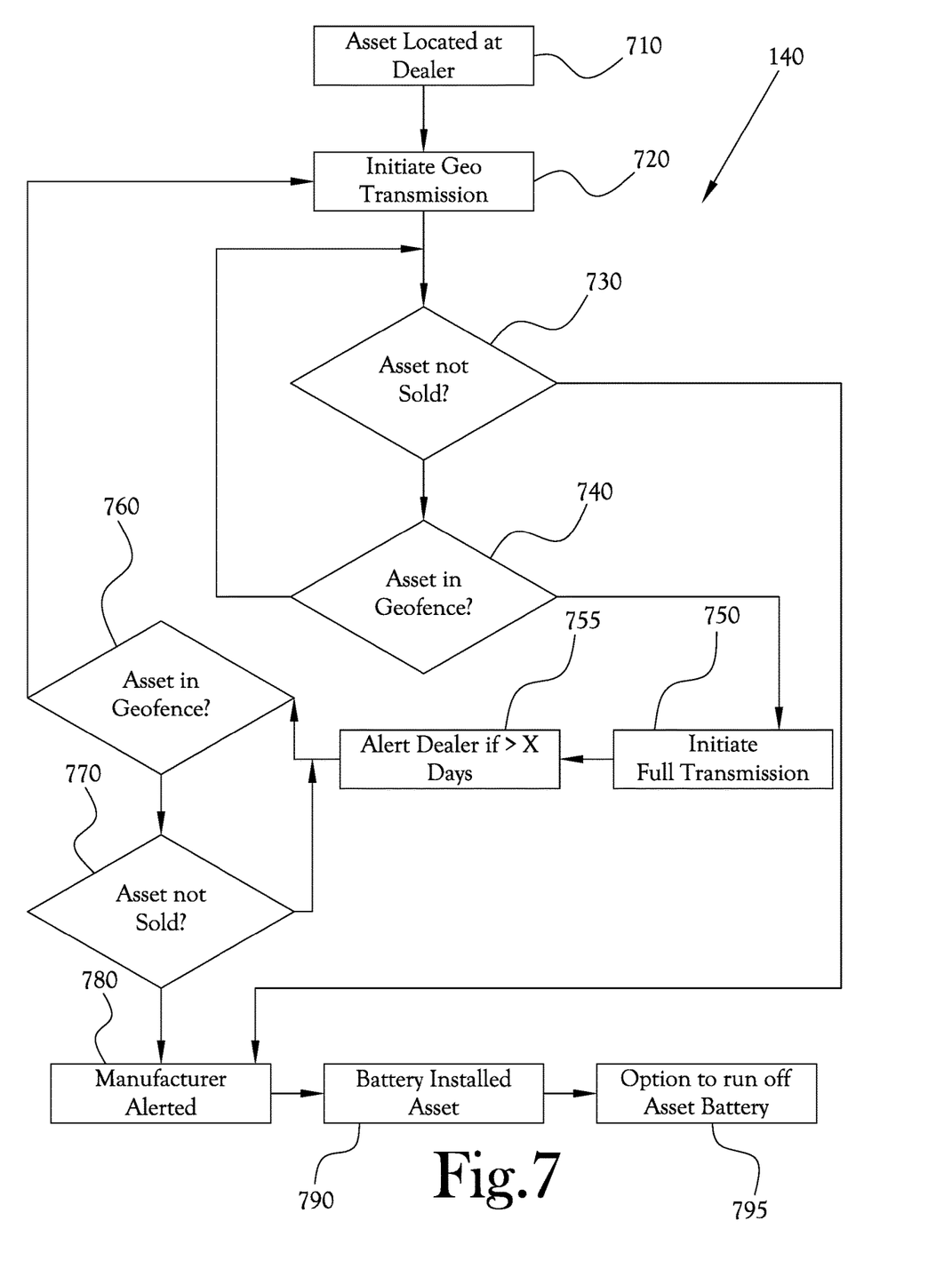
FIG. 7 is a flow diagram showing the asset held at dealer for sale step.

FIG. 7 represents the asset held at dealer for sale step shown in FIG. 1. Initially, the asset has reached its location at the dealer site 710. At this point, the GPS tracking device initiates Geo Transmission mode 720. The following step then repeats until the asset has been sold 730. If the asset is located within a Geofence at the dealer's site 740, the process repeats to determine sale to a consumer. If the asset has left the Geofence, the status is updated. The GPS tracking device then initiates full transmission mode 750. If the asset is outside the Geofence for more than a specified number of days, then the dealer is notified 755. The GPS tracking device then determines whether the asset has returned to the Geofence 760. If it has, then the status is updated, and the GPS tracking device once again initiates Geo Transmission mode 720 and the process repeats. If the GPS tracking device determines the asset has not returned to the Geofence, then the GPS tracking device queries whether the asset has been sold 770. If sold, the process exits the loop and continues to the manufacturer alerted step 780. If the asset has not been sold, then the GPS tracking device queries whether the asset is still outside the Geofence 760 and repeats. Once the item has been sold, the following steps occur: the manufacturer is alerted 780, the battery is installed in the asset 790, and an option to run off asset battery 795 rather than GPS tracking device battery is provided.

Figure 8:
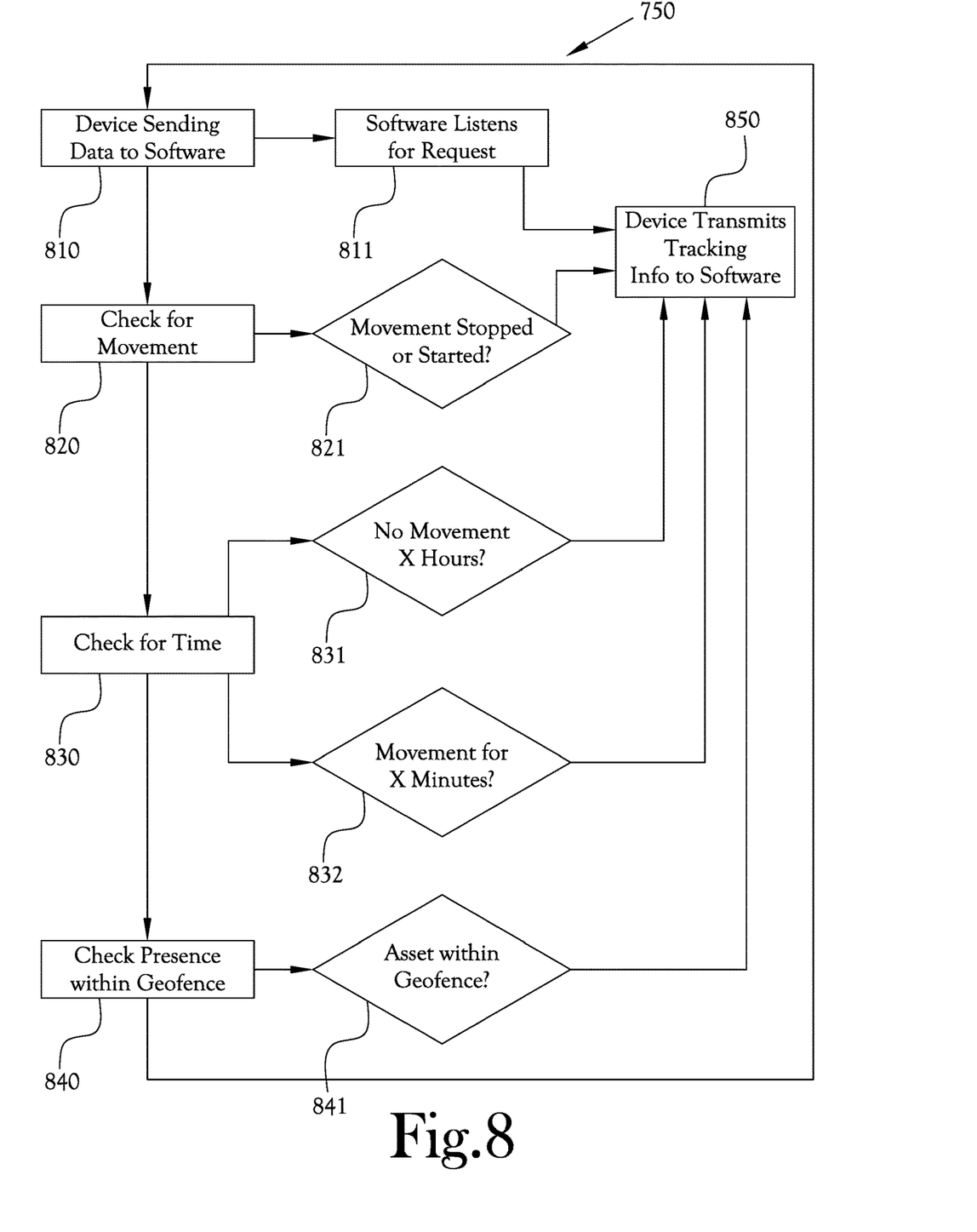
FIG. 8 is a flow diagram showing stages of the process while the GPS tracking device is in the full transmission mode

FIG. 8 represents the stages of the process while the GPS tracking device is in the full transmission mode shown in FIG. 7. Since the GPS tracking device will be located outside a Geofence during this step, outside the control of the dealer, full transmission mode will be required. In the first step, as previously shown in FIG. 3, the GPS tracking device is automatically sending data 810, while the SaaS application listens for requests for position data transmissions from the GPS tracking device 811. Next, the GPS tracking device checks for movement using an accelerometer 820. If the GPS tracking device detects that movement has stopped or started 821, the GPS tracking device transmits tracking information to the SaaS application 850. Next, the GPS tracking device checks the time durations 830 using its internal clock. If there has been no movement for a specified amount of time 831, then the GPS tracking device transmits tracking information to the SaaS application 850. If there has been constant movement for over a specified amount of time 832, then the GPS tracking device transmits tracking information to the SaaS application 850. Finally, the GPS tracking device checks the presence within a Geofence 840 as shown in FIG. 4 If the GPS tracking device has left a Geofence, then the GPS tracking device transmits tracking information to the SaaS application 850. The system then repeats these actions in a loop as long as the GPS tracking device is not located within a Geofence. If the GPS tracking device is within a Geofence 841, then the mode switches to Geo Transmission mode shown in FIG. 3.

Figure 9:
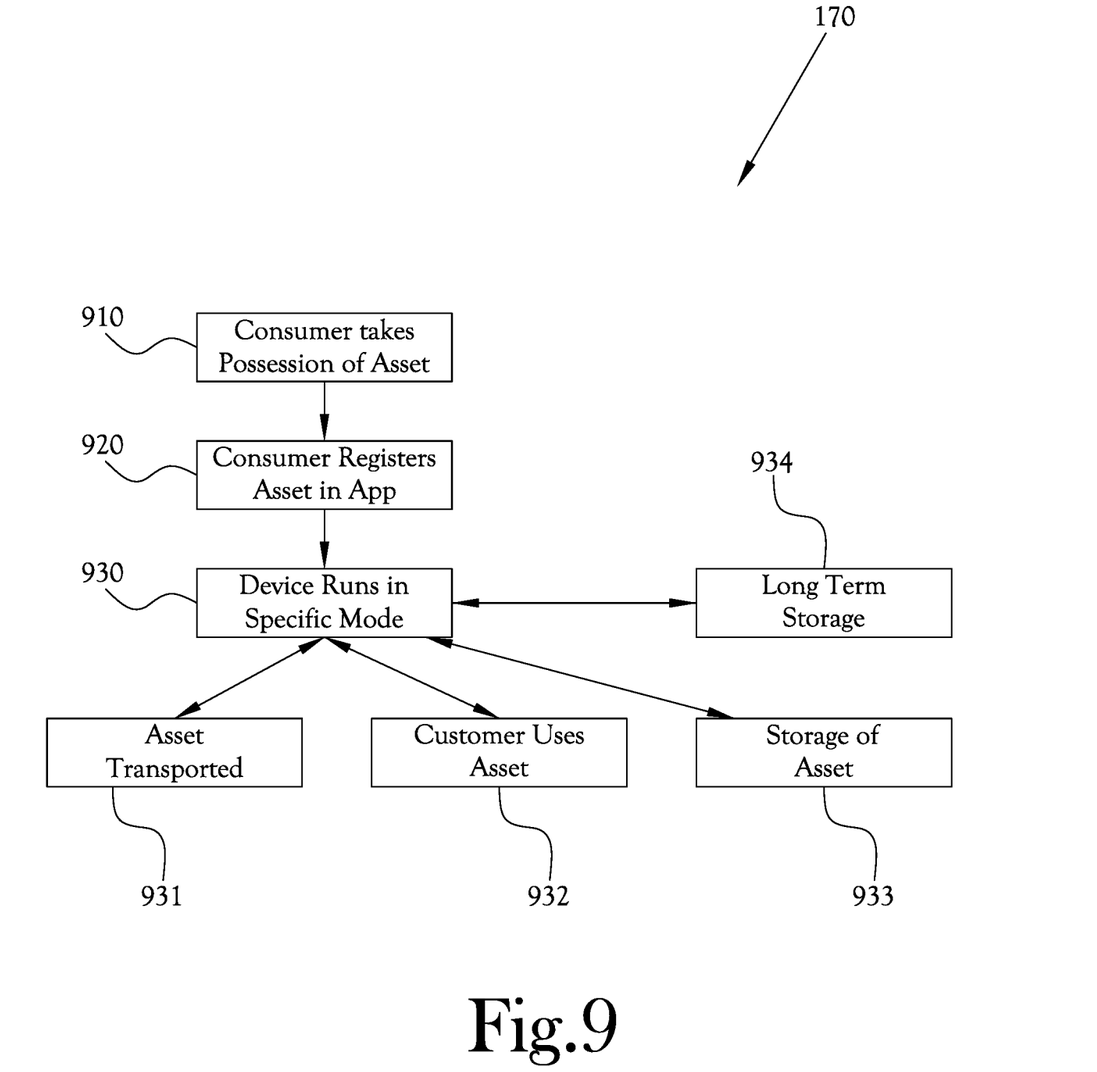
FIG. 9 is a flow diagram showing the consumer takes ownership step.

FIG. 9 represents the consumer takes ownership step of FIG. 1. In the first step, the consumer purchases the asset and take possession of it 910. Next, the consumer registers the asset with the SaaS application 920. Finally, the GPS tracking device runs in full transmission mode (in order to gather the maximum amount of data), or in another specified mode 930 while the consumer is using the asset. In addition to usage of the asset 932, the asset may be transported by the consumer 931, stored temporarily for usage 933, or held in long term storage 934. The GPS tracking device mode can be modified to best suit the given scenario. For example, during long term storage, continuous tracking may no longer be required until the device is once again in motion. As shown in FIG. 7, the consumer can run the GPS tracking device of the asset battery 795 so as not to drain the GPS battery.

While there have been described what are considered to be preferred embodiments of the present invention, it will be readily appreciated by those skilled in the art that modifications can be made without departing from the scope of the teachings herein. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

Having thus described the aforementioned invention, what is claimed is:

1. A method of tracking a moveable object, comprising:
   providing a GPS tracking device configured to be attachable to a moveable object, the GPS tracking device having a power source to power the GPS tracking device;
   providing an option to power the GPS tracking device using a separate power source of the movable object;

collecting tracking information of the moveable object using the GPS tracking device as the moveable object is moved along phases of a supply process from a manufacturer of the moveable object to a consumer of the moveable object, the tracking information including data related to use of the moveable object at any point throughout the supply process and after the consumer takes ownership of the moveable object;

transmitting collected tracking information from the GPS tracking device to a software application;

determining a frequency of data transmissions from the GPS tracking device to the software application based on one or more characteristics of transmitted tracking information;

modifying the frequency of data transmissions based on instructions from the software application; and querying the software application to determine whether the moveable object has been sold to the consumer based on the one or more the characteristics of collected tracking information.

2. The method of claim 1, wherein the tracking information includes data related to time periods of use of the moveable object by the consumer, the method further comprising transmitting collected tracking information related to the time periods of use of the moveable object by the consumer to the software application when the software application indicates the moveable object has been sold to the consumer.

3. The method of claim 1, further comprising tracking maintenance requirements of the moveable object based on transmitted tracking information related to time periods of use of the moveable object by the consumer.

4. The method of claim 1, further comprising transmitting an alert to one or more of a manufacturer, dealer, distributor, floor plan company, insurance company, and bank informing that the moveable object has been sold to the consumer.

5. The method of claim 1, further comprising:
augmenting transmitted tracking information with further comprising transmitting manufacture data relating to one or more of manufacture date, serial number, model, accessories, color, and engine type of the moveable object; and transmitting a report including collected tracking information and augmented manufacture data to one or more of a manufacturer, dealer, distributor, floor plan company, insurance company, bank, and consumer on a subscription basis.

6. The method of claim 1, further comprising modifying the frequency of data transmissions after the consumer takes delivery of the movable object.

7. The method of claim 1, further comprising modifying a type of tracking information being transmitted to the software application based on whether the moveable object is determined to be moving.

8. The method of claim 1, further comprising configuring the software application to instruct firmware of the GPS tracking device to modify the frequency of data transmissions based on the one or more characteristics of transmitted tracking information.

9. The method of claim 1, further comprising:
determining whether the moveable object is positioned within a Geo Fence boundary; and modifying the frequency based on whether the moveable object is present within the Geo Fence boundary.

* * * * *